US012555607B2

(12) United States Patent
Li et al.

(10) Patent No.: US 12,555,607 B2
(45) Date of Patent: Feb. 17, 2026

(54) AUDIO DATA PROCESSING METHOD AND APPARATUS, AND DEVICE AND STORAGE MEDIUM

(71) Applicant: Beijing Bytedance Network Technology Co., Ltd., Beijing (CN)

(72) Inventors: Cheng Li, Beijing (CN); Hao Huang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 147 days.

(21) Appl. No.: 18/023,286

(22) PCT Filed: Aug. 26, 2021

(86) PCT No.: PCT/CN2021/114706
§ 371 (c)(1),
(2) Date: Feb. 24, 2023

(87) PCT Pub. No.: WO2022/042634
PCT Pub. Date: Mar. 3, 2022

(65) Prior Publication Data
US 2023/0307004 A1 Sep. 28, 2023

(30) Foreign Application Priority Data
Aug. 26, 2020 (CN) .......................... 202010873112.3

(51) Int. Cl.
*G06F 3/00* (2006.01)
*G06F 3/0482* (2013.01)
(Continued)

(52) U.S. Cl.
CPC .......... *G11B 27/031* (2013.01); *G06F 3/0482* (2013.01); *G06F 3/04847* (2013.01); *G06F 3/165* (2013.01); *G10L 25/57* (2013.01)

(58) Field of Classification Search
CPC . G06F 3/00; G06F 3/16; G06F 3/0482; G06F 3/04847; G06F 3/165; G10L 25/00;
(Continued)

(56) References Cited

U.S. PATENT DOCUMENTS 9,728,225 B2    8/2017  Hsu
10,062,367 B1   8/2018  Evans et al.
(Continued)

FOREIGN PATENT DOCUMENTS

CN      102724423 A     10/2012
CN      106559572 A     4/2017
(Continued)

OTHER PUBLICATIONS

Extended European Search Report in EP21860468.4, mailed Dec. 4, 2023, 10 pages.
(Continued)

*Primary Examiner* — Daquan Zhao
(74) *Attorney, Agent, or Firm* — Astute IP Law Group

(57) ABSTRACT

The embodiments of the present disclosure relate to an audio data processing method and apparatus, and a device and a storage medium. The method comprises: acquiring a first play position of first audio data, and an audition instruction of a user for a first sound effect; adding the first sound effect to a first audio clip in the first audio data, generating sound effect audition data and playing same; and if a first addition instruction of the user for a second sound effect is received, according to information of a first addition length carried in the first addition instruction, adding the second sound effect to a second audio clip, which takes the first play position as a start position, in the first audio data, so as to obtain second audio data. By means of the solution provided in the embodiments of the present disclosure, a sound effect addi-
(Continued)

tion operation can be simplified, sound effect addition results are enriched, and the user experience is also enhanced.

15 Claims, 5 Drawing Sheets

(51) Int. Cl.
*G06F 3/04847* (2022.01)
*G06F 3/16* (2006.01)
*G10L 25/57* (2013.01)
*G11B 27/031* (2006.01)

(58) Field of Classification Search
CPC ......... G10L 25/51; G10L 25/57; G11B 27/00; G11B 27/031; G11B 27/34; H04N 21/00; H04N 21/439; H04N 21/44; H04N 21/47205; H04N 21/854
USPC ................ 386/280, 285, 278, 282, 239, 248
See application file for complete search history.

(56) References Cited

U.S. PATENT DOCUMENTS

| | | | |
|---|---|---|---|
| 2005/0066279 A1* | 3/2005 | LeBarton | G06T 13/00 715/725 |
| 2019/0026068 A1 | 1/2019 | Gan et al. | |
| 2020/0302933 A1* | 9/2020 | Arciero | G06F 40/289 |
| 2020/0410967 A1* | 12/2020 | Jiang | G10H 1/0025 |
| 2021/0397411 A1* | 12/2021 | Plom | G06F 3/0484 |
| 2022/0028427 A1* | 1/2022 | Matsuda | H04N 5/2625 |

FOREIGN PATENT DOCUMENTS

| | | |
|---|---|---|
| CN | 108965757 A | 12/2018 |
| CN | 109346111 A | 2/2019 |
| CN | 109754825 A | 5/2019 |
| CN | 110377212 A | 10/2019 |
| CN | 111142838 A | 5/2020 |
| CN | 112165647 A | 1/2021 |
| JP | 2009204907 A | 9/2009 |
| JP | 2014095806 A | 5/2014 |
| JP | 2019205151 A | 11/2019 |
| WO | 2017013762 A1 | 1/2017 |
| WO | 2020151008 A1 | 7/2020 |

OTHER PUBLICATIONS

International Search Report issued in International Patent Application No. PCT/CN2021/114706 on Nov. 25, 2021.
Communication pursuant to Article 94(3) EPC for European Patent Application No. 21860468.4, mailed on Oct. 8, 2024, 6 pages.
Decision to Grant a Patent for Japanese Application No. 2023-513340, mailed on Oct. 1, 2024, 5 pages.
Office Action for Japanese Patent Application No. 2023-513340, mailed Mar. 12, 2024, 10 pages.

* cited by examiner

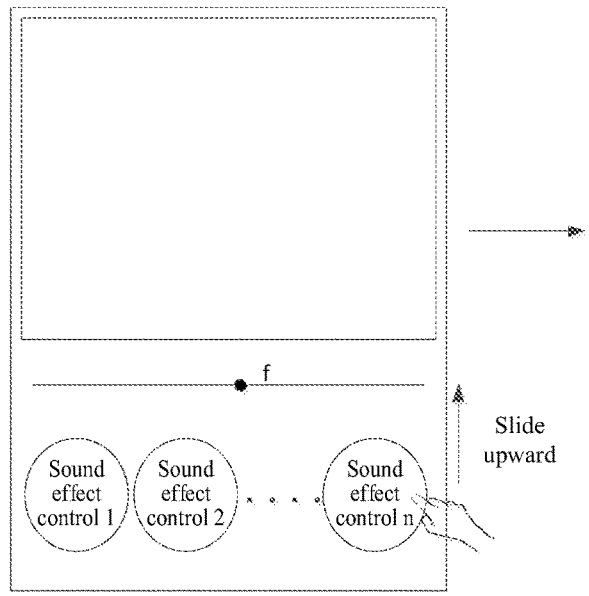
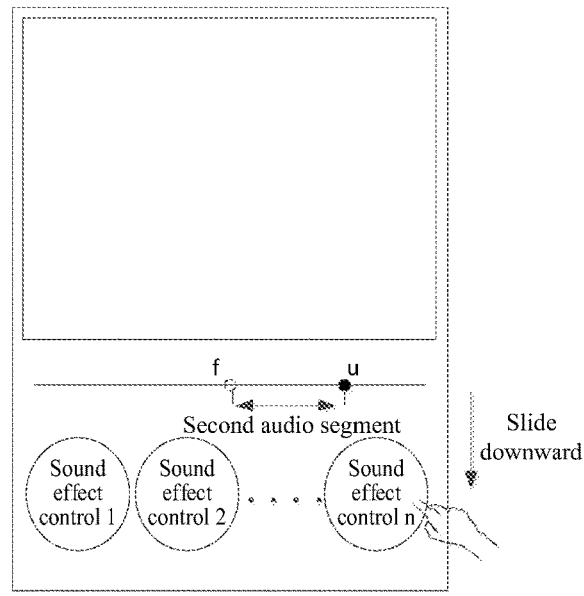
Figure 5A                Figure 5B
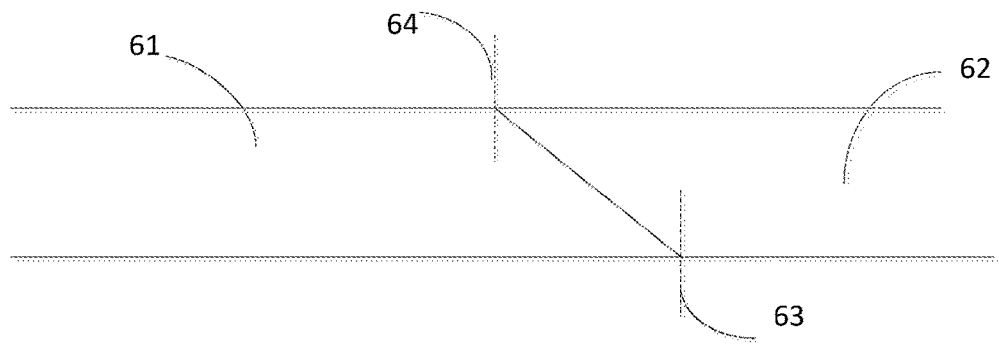
Figure 6

AUDIO DATA PROCESSING METHOD AND APPARATUS, AND DEVICE AND STORAGE MEDIUM

This application is a national stage of International Application No. PCT/CN2021/114706, filed on Aug. 26, 2021, which claims priority to Chinese Patent Application No. 202010873112.3, titled "AUDIO DATA PROCESSING METHOD AND APPARATUS, AND DEVICE AND STORAGE MEDIUM", filed on Aug. 26, 2020 with the China National Intellectual Property Administration, both of which are incorporated herein by reference in their entireties.

FIELD

Embodiment of the present disclosure relates to the technical field of audio data processing, in particular to a method and device for processing audio data, an apparatus, and a storage medium.

BACKGROUND

Video applications provided by relevant technologies have a voice changing function, through which users can add a preferred voice changing effect to a video. However, the method for adding the voice changing effect to the video provided in the relevant technologies cannot meet user requirements.

SUMMARY

In order to solve or at least partially solve the above technical problems, a method and a device for processing audio data, an apparatus, and a storage medium are provided according to embodiments of the present disclosure.

In a first aspect of the present disclosure, a method for processing audio data is provided according to an embodiment. The method includes: acquiring a first playback position on first audio data, and an audition instruction of a user for a first sound effect; adding the first sound effect to a first audio segment in the first audio data to generate sound effect audition data, and playing the sound effect audition data, where the first audio segment starts from the first playback position; receiving a first adding instruction of the user for a second sound effect, and adding the second sound effect to a second audio segment in the first audio data in response to the received first adding instruction to obtain second audio data, where the first adding instruction includes information on a first adding length of the second sound effect to be added in the first audio data, and where the second audio segment starts from the first playback position, and has a length of the first adding length.

In a second aspect of the present disclosure, a device for processing audio data is provided according to an embodiment. The device includes: a first acquisition module, a first sound effect addition module, a first receiving module and a second sound effect addition module.

The first acquisition module is configured to acquire a first playback position on first audio data, and an audition instruction of a user for a first sound effect.

The first sound effect addition module is configured to add the first sound effect to a first audio segment in the first audio data to generate sound effect audition data, and play the sound effect audition data, where the first audio segment starts from the first playback position.

The first receiving module is configured to receive a first adding instruction of the user for a second sound effect, where the first adding instruction includes information on a first adding length of the second sound effect to be added in the first audio data.

The second sound effect addition module is configured to add the second sound effect to a second audio segment in the first audio data to obtain second audio data, where the second audio segment starts from the first playback position, and has a length of the first adding length.

In a third aspect of the present disclosure, a terminal device is provided according to an embodiment. The terminal device includes: a memory and a processor. The memory stores a computer program. The computer program, when executed by the processor, causes the processor to implement the method according to the above first aspect.

In a fourth aspect of the present disclosure, a computer-readable storage medium storing a computer program is further provided according to an embodiment. The computer program, when executed by a processor, can perform the method according to the above first aspect.

Advantages of the technical solution provided in the embodiments of the present disclosure, compared with the conventional technologies, are described below.

In the embodiments of the present disclosure, the first playback position on the first audio data and the audition instruction of the user for the first sound effect are acquired, the first sound effect is added to the first audio segment in the first audio data to obtain the sound effect audition data for audition, and then the sound effect audition data is played; and in response to a reception of the first adding instruction of the user for the second sound effect, the second sound effect is added to the second audio segment in the first audio data based on the first adding length carried in the first adding instruction, so as to obtain the second audio data, where the second audio segment starts from the first playback position. Based on the solution in the embodiments, the user can select any position on the audio data for auditioning the sound effect, and the satisfying sound effect may be added to a certain audio segment of the audio data based on the in the audition result. Hence, compared to a condition where the adding effect of the sound effect cannot be auditioned, the solution provided in the present disclosure enables the user to select a satisfying sound effect through audition and add the satisfying sound effect to the audio data. Thereby, it is ensured that the sound effect added to the audio data is satisfying for the user, and a situation in which the user is not satisfied with an added sound effect and has to add another sound effect is avoided. Hence, user operation is simplified, and user experience is improved. In addition, with the solution according to the embodiments of the present disclosure, the user can add a certain sound effect on a certain audio segment in the audio data, and can add multiple sound effects correspondingly to multiple audio segments in the audio data. In this way, the adding effect of sound effect is enriched, an interest of adding the sound effects is improved, and user experience is improved.

BRIEF DESCRIPTION OF THE DRAWINGS

The accompanying drawings are incorporated herein and constitute a part of this specification. The drawings illustrate embodiments consistent with the present disclosure and, together with the specification, serve to explain the principles of the present disclosure.

In order to more clearly explain the embodiments of the present disclosure or the technical solutions in the conventional technology, the drawings used in the description of the embodiments or the conventional technology are briefly introduced below. Apparently, those skilled in the art can obtain other drawings based on the provided drawings without any creative effort.

FIG. 5A and FIG. 5B are schematic diagrams of a method for adding a sound effect according to yet another embodiment of the present disclosure.

FIG. 6 is a schematic diagram of a method for smoothing an audio according to an embodiment of the present disclosure.

DETAILED DESCRIPTION

To enable a clearer understanding of the above-described objectives, features and advantages of the present disclosure, the embodiments of the present disclosure are further described below. It is noted that the embodiments of the present disclosure and features in the embodiments can be combined with each other without conflicts.

Although many specific details are set forth in the following description to facilitate a full understanding of the present disclosure, the present disclosure may be implemented in other ways than those described herein. Apparently, the embodiments in the specification are only some of, rather than all, embodiments of the present disclosure.

Figure 1:
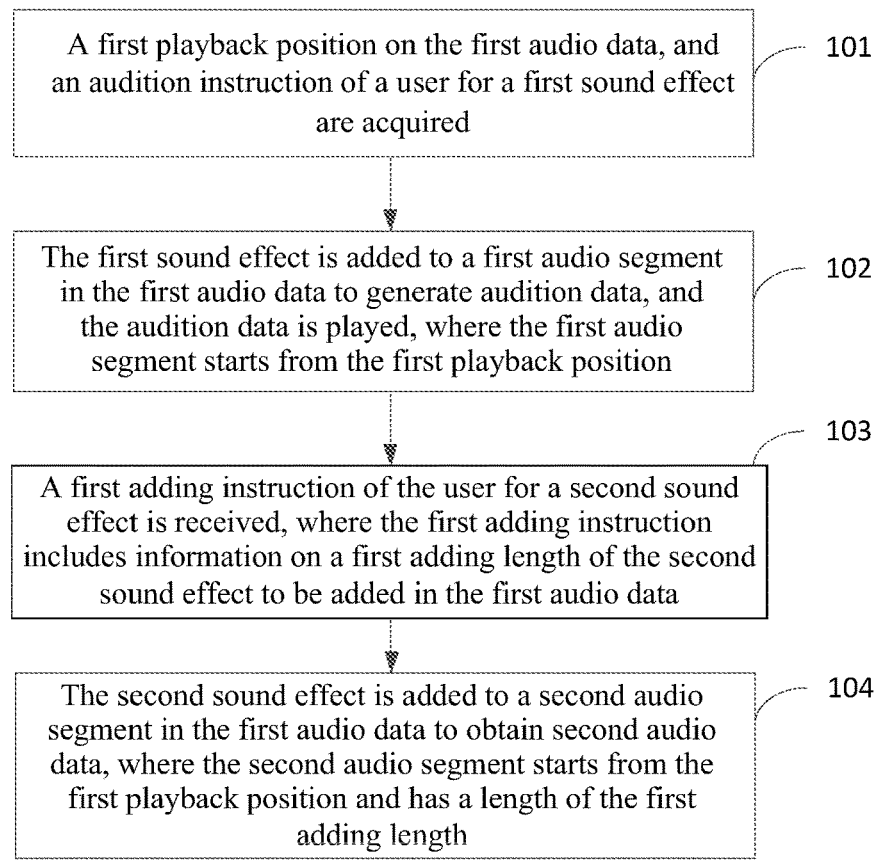
FIG. 1 shows a flowchart of a method for processing audio data according to an embodiment of the present disclosure.

FIG. 1 is a flowchart of a method of processing audio data according to an embodiment of the present disclosure. The method may be performed by a terminal device. The terminal device may be exemplarily understood to be a cell phone, a tablet, a laptop, a desktop, a smart TV, or other devices having capabilities of audio processing and video playback. In an embodiment, the terminal device referred to herein may be equipped with a sound capture device (such as a microphone, but is not limited thereto). The terminal device may capture audio data through a sound capture device, and add one or more sound effects to the audio data through the method described in embodiments. The sound effect here refers to a sound form that can be superimposed on audio data to make the audio data present a specific sound performance (for example, a tremor effect, an electrophonic effect, or a cartoon effect, which is not limited thereto). In another embodiment, the terminal device may be equipped with a shooting device and a sound capture device. The shooting device captures video images while the sound capture device captures audio data, so as to generate an audible video. The terminal device may add one or more sound effects onto audio data of the audible video through the method in the embodiment. As shown in FIG. 1, the method in such embodiments includes steps 101 to 104.

In step 101, a first playback position on the first audio data, and an audition instruction of a user for a first sound effect are acquired.

The term "first audio data" here is only defined for a convenience of distinguishing multiple pieces of audio data involved in the embodiment, which has no other meaning. The first audio data in an example may be understood as audio data of a to-be-edited video in a video editing interface or audio data recorded by other ways. The first audio data in this embodiment may be audio data to which one or more sound effects have been added, or may be audio data without adding the sound effect. When the first audio data is added with a single sound effect, the sound effect may be added to the whole audio data, or may be added to an audio segment of the first audio data. When the first audio data is added with multiple sound effects, the multiple sound effects may be added on different audio segments of the audio data. For example, the sound effects are added on the audio segments in a one-to-one correspondence.

In an embodiment, the first playback position may be understood to be a position selected by a user from the first audio data. Alternatively, when the user does not select a position, the first playback position may be understood to be a default position on the first audio data, such as a start position or a middle position of the first audio data, which will not be limited herein.

In an embodiment, the operation of acquiring the first playback position on the first audio data and the audition instruction of the user for the first sound effect may be triggered by at least one of the following user operations: a preset operation of the user on the operation interface, or a preset voice instruction.

Figure 2A:
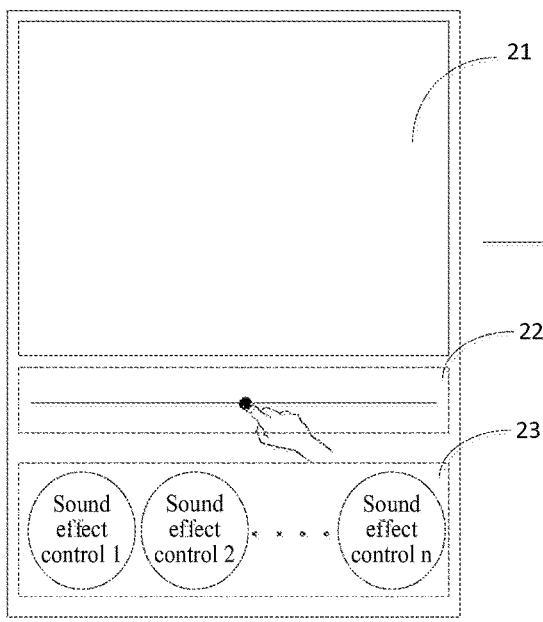
FIG. 2A and FIG. 2B are schematic diagrams showing operations on an operation interface according to an embodiment of the present disclosure.
Figure 2B:
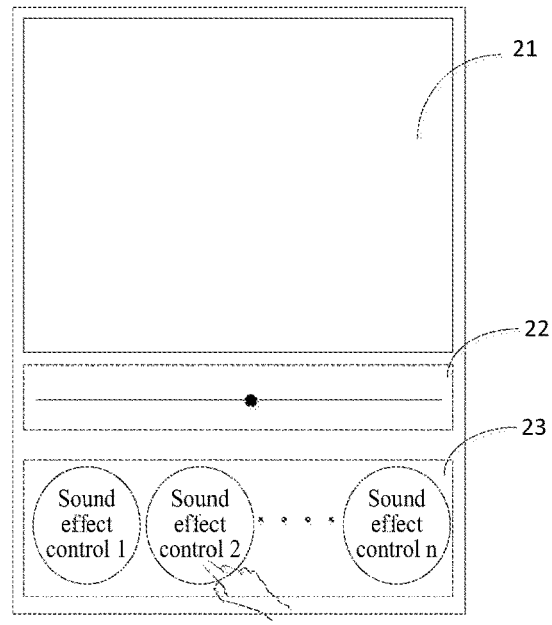

FIG. 2A and FIG. 2B are schematic diagrams showing operations on an operation interface according to an embodiment of the present disclosure. Reference is made to FIG. 2A to FIG. 2B. The operation interface includes a display area 21, a first operation area 22, and a second operation area 23. The first operation area 22 includes a playback progress control. A playback position on first audio data may be selected by moving a focus on the playback progress control. The second operation area 23 includes at least one sound effect control. One sound effect control corresponds to one sound effect. When the first audio data belongs to a video, the operation interfaces shown in FIG. 2A and FIG. 2B may specifically be video-editing interfaces. In such case, the display area 21 is configured to display an image in the video, and the playback progress control in the first operation area 22 is configured to adjust the playback position of the video. In this case, the playback position of the video may be mapped to the first audio data based on a correspondence between the playback positions of the video and the first audio data, so as to obtain the playback position on the first audio data (i.e., the first playback position in the embodiment). When the first audio data is obtained through a sound capture device and there is no image of the video, the interfaces shown in FIG. 2A and FIG. 2B may be audio-editing interfaces, in which the display area 21 may display a sound curve of the first audio data, and the position of the focus on the playback progress control indicates the playback position of the first audio data.

Reference is made to FIG. 2A. A user may click on any position on a playback progress bar (shown in FIG. 2A by a line with the focus) in the interface shown in FIG. 2A. In an exemplary embodiment, a prompt message for prompting the user to select a start position for the sound effect may be present on the interface shown in FIG. 2A. The prompt message can help the user quickly select a position on the playback progress bar. For example, in response to the user clicking on the playback progress bar, the focus of the playback progress control is moved to the location on which the user clicked. The position of the focus on the playback progress bar is mapped to the first audio data to obtain the first playback position. In another implementation, the user may drag the focus along the playback progress bar in response to the prompt message. When the focus stops at a position, the position of the focus on the playback progress bar is mapped to the first audio data to obtain the first playback position.

Reference is made to FIG. 2B. After the user selects the first playback position, the user triggers an audition instruction by performing a preset operation on a sound effect control on the second operation area 23. The preset operation may be, for example, any one of a single click on a sound effect control, multiple consecutive clicks on a sound effect control, or sliding a sound effect control in a predetermined direction, which will not be limited thereto. For example, in response to the user performing the preset operation on a sound effect control 2 as shown in FIG. 2B, the audition instruction for a sound effect corresponding to the sound control 2 is triggered. In this case, this sound effect corresponding to the sound control 2 is referred to the first sound effect in the embodiment. If the user is not satisfied with the sound effect corresponding to the sound control 2, the user may further perform the preset operation on another sound effect control in the second operation area 23, so as to trigger an audition of another sound effect corresponding to the another sound effect control. In some implementations, a prompt message about how to audition a sound effect may be displayed on the display interface in FIG. 2B, in order to guide the user to quickly trigger an audition of a sound effect and therefore reduce usage difficulty for the user.

Apparently, the above description are only exemplary illustrations with reference to FIG. 2A and FIG. 2B, which will not be limited in the embodiments of the present disclosure.

In step 102, the first sound effect is added to a first audio segment in the first audio data to generate audition data, and the audition data is played, where the first audio segment starts from the first playback position.

Exemplarily, there are several methods for adding the first sound effect.

Figure 3A:
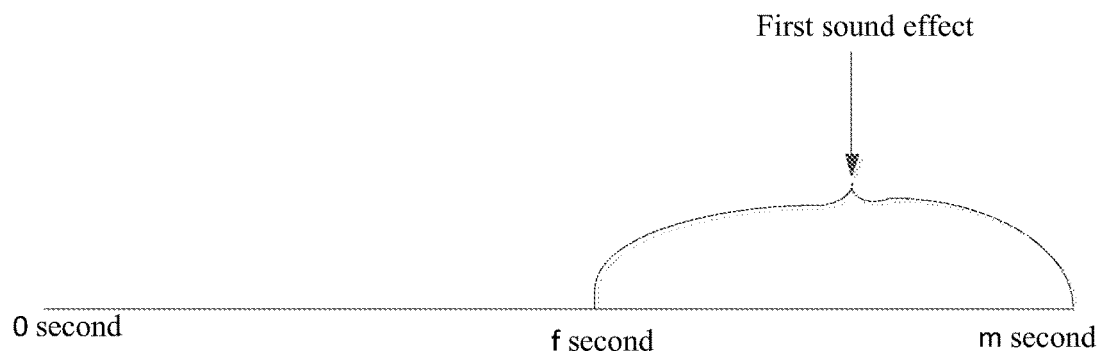
FIG. 3A is a schematic diagram of a method for adding a sound effect according to an embodiment of the present disclosure.

In one method for adding the first sound effect, the first sound effect may be added to all audio data of the first audio data after the first playback position. FIG. 3A is a schematic diagram of a method for adding a sound effect according to an embodiment of the present disclosure. Reference is made to FIG. 3. The first audio data has a length of m seconds, and the first playback position selected by the user is an f-th second of the audio data, as shown in FIG. 3. In this case, the first sound effect may be added to an audio segment from the f-th second to the m-th second.

Figure 3B:
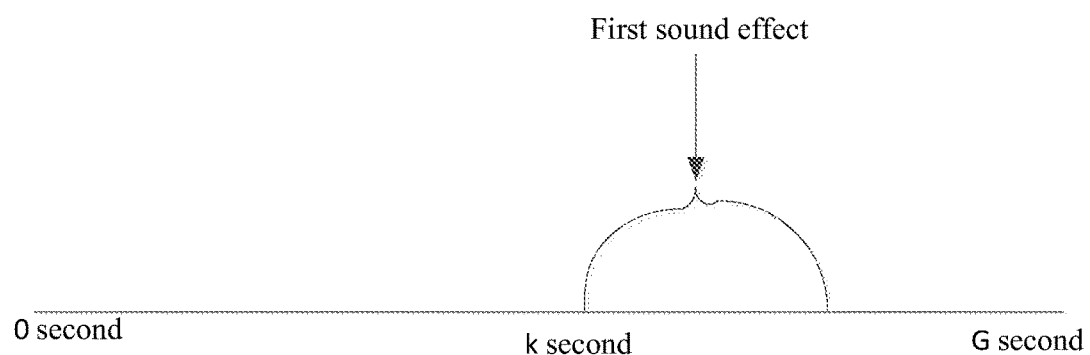
FIG. 3B is a schematic diagram of a method for adding a sound effect according to another embodiment of the present disclosure.

In another method for adding the first sound effect, the first sound effect may be added to an audio segment of the first audio data that starts from the first playback position and lasts for a preset length (such as 1 second, which will not be limited herein). FIG. 3B is a schematic diagram of a method for adding a sound effect according to an embodiment of the present disclosure. Reference is made to FIG. 3B. The first audio data has a length of G seconds, and the first playback position selected by the user is a K-th second of the first audio data. In this case, the first sound effect may be added to an audio segment that starts from the K-th second and lasts for the preset length, in the exemplary method for adding the first sound effect.

It should be noted that although merely two methods for adding the first sound effect are described above in the embodiment, it does not indicate that the method for adding the first sound effect is limited thereto. The method for adding the first sound effect may be determined as needed, which is not limited to a fixed one.

Reference is made to the interface shown in FIG. 2A or FIG. 2B. The focus on the playback progress control moves along the playback progress bar synchronously while the sound effect audition data is played. In an example, after playback of the sound effect audition data is finished, the focus on the playback progress bar is returned to a start position selected by the user. That is, after playing of the sound effect audition data is finished, the playback position of the first audio data may be returned to the first playback position in the embodiment. The description herein is merely one implementation, rather than all embodiments. In other practical implementations, the focus may not be returned to the start position selected by the user after playback of the sound effect audition data is finished.

The playback position of the first audio data is returned to the first playback position after playback of the sound effect audition data is finished. In this way, the user can listen to multiple sound effects in a convenient way. When the user needs to audition a new sound effect other than the current sound effect, the user does not have to re-select the start position of the new sound effect. Hence, user operation is simplified and user experience is improved. Additionally, when the user is satisfied with the current sound effect, there is no need to find the start position of the sound effect in the audition audio data, which simplifies user operation and improves accuracy of adding the sound effect.

In step 103, a first adding instruction of the user for a second sound effect is received, where the first adding instruction includes information on a first adding length of the second sound effect to be added in the first audio data.

In an embodiment, the first adding instruction may be triggered by a preset operation on the interface or a voice command. The preset operation on the interface may be, for example, a long press on the sound effect control, a sliding in a predetermined direction, or a continuous click on the sound effect control, which will not be limited herein.

Reference is made to the interface as shown in FIG. 2A or FIG. 2B. In an embodiment, a prompt message for prompting the user to add a sound effect in the first audio data may be displayed in the interface on a terminal device. With the prompt message, the user can quickly add the sound effect to the first audio data.

In the embodiment, the prompt message is displayed on the interface to guide the user to add a sound effect. In this way, the user can quickly learn a method for adding the sound effect and successfully add the sound effect to the audio data. Hence, fluency and experience of user operation are improved.

In an embodiment, the information on a first adding length may include information on an end position of the sound effect or information on a duration of the sound effect.

In step 104, the second sound effect is added to a second audio segment in the first audio data to obtain second audio data, where the second audio segment starts from the first playback position and has a length of the first adding length.

In an embodiment, the second sound effect may be the first sound effect auditioned by the user or may be an un-auditioned sound effect selected by the user from an operation interface.

In some embodiments, the method for adding the second sound effect may include at least the following.

Figure 4A:
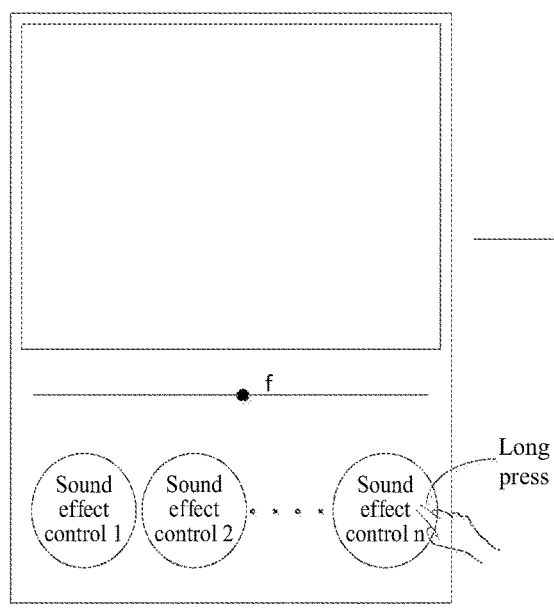
FIG. 4A and FIG. 4B are schematic diagrams of a method for adding a sound effect according to yet another embodiment of the present disclosure.
Figure 4B:
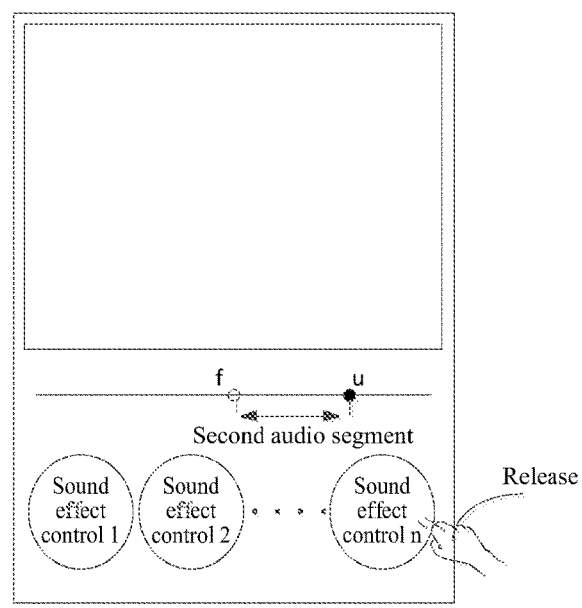

In a method for adding the second sound effect, after the first playback position on the first audio data is acquired, the user can add the second sound effect to the first audio data from the first playback position by performing a long press on a sound effect control corresponding to the second sound effect, and stop adding the sound effect by releasing the press. Thereby, an audio segment with a length of the first adding length (i.e., the second audio segment) is obtained. FIG. 4A and FIG. 4B are schematic diagrams of a method for adding a sound effect according to yet another embodiment of the present disclosure. Reference is made to FIG. 4A and FIG. 4B. The playback position f is selected by the user as a start position for adding the sound effect (that is, the first playback position). As shown in FIG. 4A, when the user performs a long press on the sound effect control n, in response to a press period of the user longer than a first preset period (such as 0.5 seconds, which is not limited thereto), the sound effect corresponding to the sound effect control n (i.e., the second sound effect) is added to the first audio data, starting from the playback position f. The audio added with the sound effect is then played from the playback position f. The focus on the playback progress control moves synchronously with playing of the audio data on the playback process bar in an arrow direction shown in FIG. 4A. As shown in FIG. 4B, assuming that the user stops pressing when the focus moves to a position u, adding of the sound effect is stopped at the position u. An audio segment in the first audio data from the position f to the position u is referred to as the second audio segment.

In another example, after the first playback position on the first audio data is required, the user can trigger an operation of adding a sound effect by sliding a sound effect control in a preset direction. When the user slides the sound effect control in the preset direction, the sound effect corresponding to the sound effect control (that is, the second sound effect) is added to the first audio data from the first playback position. Adding of the sound effect is stopped, when the user slides the sound effect control in the preset direction again or in a direction opposite to the preset direction. The end position of the sound effect on the first audio data is referred to as a third playback position. An audio segment of the first audio data between the first playback position and the third playback position is referred to as the second audio segment. FIG. 5A and FIG. 5B are schematic diagrams of a method for adding a sound effect according to yet another embodiment of the present disclosure. Reference is made to FIG. 5A and FIG. 5B. A playback position f is selected by the user as a start position for adding a sound effect (that is, the first playback position). As shown in FIG. 5A, in response to the user sliding a sound effect control n upward, the sound effect corresponding to the sound effect control n (i.e., the second sound effect) is added to the first audio data, starting from the playback position f. The audio added with the sound effect is then played from the playback position f. The focus on the playback progress control moves synchronously with playing of the first audio data on the playback process bar in an arrow direction shown in FIG. 5A. As shown in FIG. 5B, assuming that the user slides the sound effect control n downward when the focus moves to a position u, adding of the sound effect is stopped at the position u. The position u is referred to as the end position of the sound effect. An audio segment in the first audio data from the position f to the position u is referred to as the second audio segment.

In yet another example, after the first playback position on the first audio data is acquired, the user can trigger an operation of adding a sound effect by continuously clicking on a sound effect control. In response to the user continuously clicking on the sound effect control, the sound effect corresponding to the sound effect control (that is, the second sound effect) is added to the first audio data from the first playback position. Adding of the sound effect is stopped, in response to the user continuously clicking on the sound effect control again. In this case, an audio segment in the first audio data from the first playback position to a position at which the adding of the sound effect is stopped is referred to as the second audio segment.

Although merely three methods for adding the sound effect are described here, the method for adding the sound effect is not limited thereto and may be determined as needed in practice.

It is to be noted that although a single sound effect is added to a single audio segment of an audio as described in the above method, it may be understood by those skilled in the art that multiple sound effects may be added to an audio through the above-mentioned method. For example, after the second audio data is obtained through the above-mentioned method, a second playback position on the second audio data and a second adding instruction of the user for a third sound effect may be acquired in a similar way as described above. In response to the second adding instruction, the third sound effect is added to a third audio segment in the second audio data to obtain a third audio data. In this way, the third audio data includes two sound effects. The third audio segment may be understood as an audio segment in the second audio data, which starts from the second playback position and has a length of the second adding length.

Further, a sonic boom may occur at a connection of two difference sound effects in a case that the two different sound effects are consecutive. To solve the problem, a smoothing method is provided in the present disclosure. In the smoothing method, a former one of two sound effects is faded out and a latter one of the two sound effects is faded in, realizing a smooth transition at a connection of the two sound effects. For example, FIG. 6 is a schematic diagram of a method for smoothing an audio according to an embodiment of the present disclosure. A width between the two horizontal lines in FIG. 6 indicates a volume. In FIG. 6, a sound effect 61 corresponds to the second sound effect defined in the present disclosure, a sound effect 62 corresponds to the third sound effect defined in the present disclosure, and an end position 63 of the second sound effect is a start position of the third sound effect. In a process of smoothing a connection of the second sound effect and the third sound effect, it is required to fade out the second sound effect. Thus, the volume of the second sound effect starts to be reduced from a position 64 in a preset distance from the end position 63, and is reduced to 0 at the end position 63. Additionally, in order to avoid a sudden change of the volume of the audio, the third sound effect may be faded in from the position 64. That is, a volume of the third sound effect is gradually increased, and is increased to a set value at the end position 63. Through such cross-fade processing on the two consecutive sound effects, a smooth transition at the connection of the two sound effects can be realized, occurrence of a sonic boom is avoided, and user experience is improved. Apparently, the method shown in FIG. 6 is only an exemplary illustration, and is not intended to be a limitation. In practice, there are a variety of methods for smoothing the audio according to conventional technologies, and any of the methods is applicable here.

In the embodiments, the first playback position on the first audio data and the audition instruction of the user for the first sound effect are acquired, the first sound effect is added to the first audio segment in the first audio data to obtain the sound effect audition data for audition, and then the sound effect audition data is played; and in response to a reception of the first adding instruction of the user for the second sound effect, the second sound effect is added to the second audio segment in the first audio data based on the first adding length carried in the first adding instruction, so as to obtain the second audio data, where the second audio segment starts from the first playback position. Based on the solution in the embodiments, the user can select any position on the audio data for auditioning the sound effect, and the satisfying sound effect may be added to a certain audio segment of the audio data based on the in the audition result. Hence, compared to a condition where the adding effect of a sound effect cannot be auditioned, the solution provided in the present disclosure enables the user to select a satisfying sound effect through audition and add the satisfying sound effect to the audio data. Thereby, it is ensured that the sound effect added to the audio data is satisfying for the user, and a situation in which the user is not satisfied with an added sound effect and has to add another sound effect is avoided. Hence, user operation is simplified, and user experience is improved. In addition, with the solution according to the embodiments of the present disclosure, the user can add a certain sound effect on a certain audio segment in the audio data, and can add multiple sound effects correspondingly to multiple audio segments in the audio data. In this way, an interest of adding the sound effects is improved, and user experience is improved.

Figure 7:
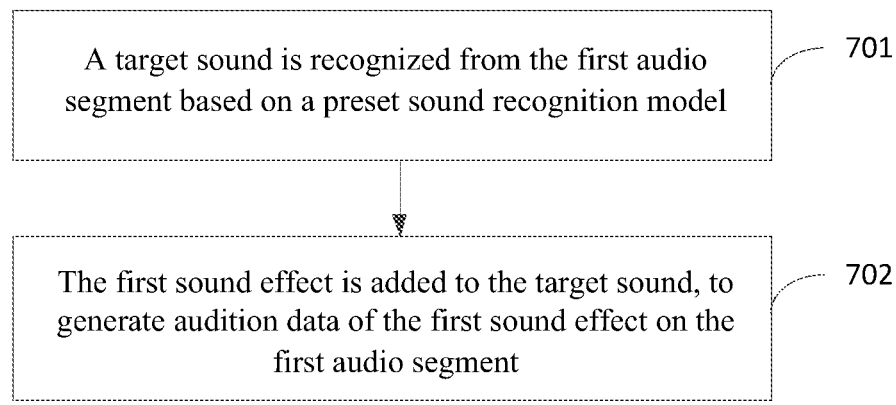
FIG. 7 is a flowchart of a method for processing audio data according to another embodiment of the present disclosure.

FIG. 7 is a flowchart of a method of processing audio data according to another embodiment of the present disclosure. Reference is made to FIG. 7. The method for adding the first sound effect includes steps of 701 and 702.

In step 701, a target sound is recognized from the first audio segment based on a preset sound recognition model.

In step 702, the first sound effect is added to the target sound, to generate audition data of the first sound effect on the first audio segment.

Exemplarily, the target sound includes at least one of: voice of a human, sound of an animal, sound of a vehicle, sound of musical instruments, a background sound, and a foreground sound.

In an embodiment, the sound recognition model may be exemplarily understood as a model capable of recognizing and extracting one or more of the above-mentioned target sounds, where the model is pre-trained through a model training method. The model may be, but not limited to, at least one of: a support vector machine model, a deep neural network model, a logistic regression model, or the like.

Figure 8:
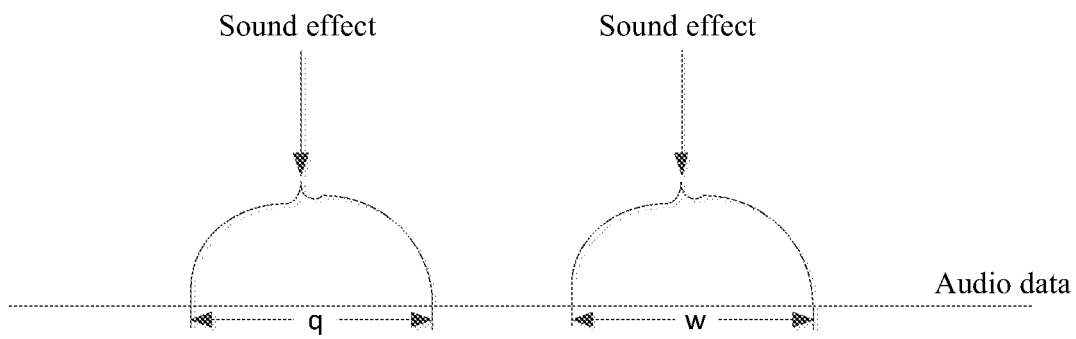
FIG. 8 is a schematic diagram showing a method for adding a sound effect according to an embodiment of the present disclosure.

Reference is made to the methods shown as FIG. 3A and FIG. 3B. After the first audio segment starting from the first playback position is obtained based on the first playback position, an editing interface including one or more sound option may be presented to the user. At least one of the sound options may be selected by the user as a target sound. Then, a sound recognition model is invoked for recognizing the target sound. By means of the sound recognition model, the target sound is recognized from the first audio segment, to obtain a position of the target sound. Further, after the position of the target sound is obtained, the first sound effect may be added to the position of the target sound to generate audition data. In another embodiment, audio data of the target sound is firstly extracted at the position of the target sound. Then, the first sound effect is added to the audio data of the target sound to generate sound-changed data, and the sound-changed data is added to the position of the target sound on the first audio segment, so as to generate the audition data. FIG. 8 is a schematic diagram of a method for adding a sound effect according to an embodiment of the present disclosure. In FIG. 8, the horizontal line indicates audio data. As shown in FIG. 8, it is assumed that positions of target sounds recognized by the sound recognition model are q and w. In a process of adding the sound effect, the sound effect may be directly added to the positions q and w on the audio data. Alternatively, data of the target sound may be extracted at the position q and the position w. The sound effect may be respectively added to the target sound at the position q and the target sound at the position w, to obtain sound-changed data for the position q and sound-changed data for the position w; and the sound-changed data for the position q is added to the audio data at the position q, and the sound-changed data for the position w is added to the audio data at the position w. In this way, the audition data is obtained. The above description is merely an example for illustration, and is not the unique limitation to the method for adding a sound effect.

It is to be noted that, in some embodiments, the method for adding the sound effect described here is also applicable to the process of adding the second sound effect mention in previous embodiments. That is, the second sound effect may be added to a target sound in the second audio segment by applying the method according to the embodiment. Details of the method for adding the second sound effect may be referred to the method according to the embodiment, which will not be repeated herein.

In the embodiment, the target sound in the audio segment is recognized by using the preset sound recognition model, and the sound effect is added to the target sound in the audio segment. Thus, adding of the sound effect is more interesting, and user experience is improved.

Figure 9:
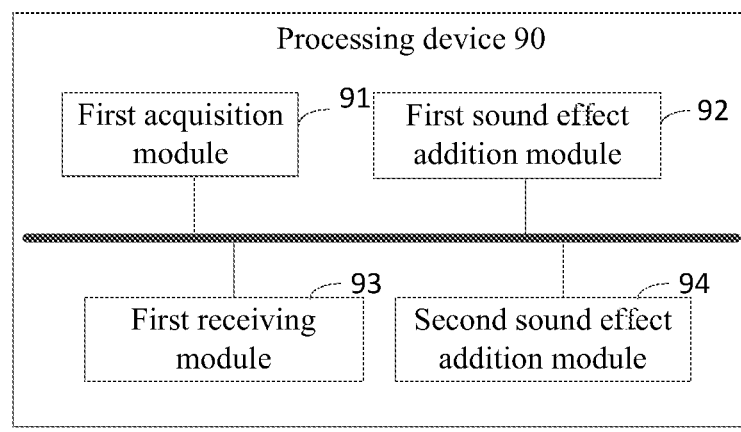
FIG. 9 is a schematic structural diagram of a device for processing audio data according to an embodiment of the present disclosure.

FIG. 9 is a schematic structural diagram of a device for processing audio data according to an embodiment of the present disclosure. The device may be understood as the above-mentioned terminal device or some functional modules in the above-mentioned terminal device. As shown in FIG. 9, a processing device 90 includes a first acquisition module 91, a first sound effect addition module 92, a first receiving module 93, and a second sound effect addition module 94.

The first acquisition module 91 is configured to obtain a first playback position on first audio data and an audition instruction of the user for a first sound effect.

The first sound effect addition module 92 is configured to add the first sound effect to a first audio segment of the first audio data to generate sound effect audition data, and play the sound effect audition data, where the first audio segment starts from the first playback position.

The first receiving module 93 is configured to receive a first adding instruction of the user for a second sound effect. The first adding instruction includes information on a first adding length of the second sound effect to be added to the first audio data.

The second sound effect addition module 94 is configured to add the second sound effect to a second audio segment of the first audio data to obtain second audio data, where the second audio segment starts from the first playback position and has a length of the first adding length.

In an embodiment, the first audio data is audio data of a to-be-edited video in a video editing interface.

In an embodiment, the first acquisition module 91 includes a first display unit and an acquisition unit.

The first display unit is configured to display the video editing interface. The video editing interface includes a playback progress control for a video and a sound effect control for the first sound effect.

The acquisition unit is configured to acquire the first playback position selected by the user through the playback progress control, and the audition instruction triggered by the user through the sound effect control.

In an embodiment, the device 90 may further include a resetting module.

The resetting module is configured to return a playback position of the first audio data to the first playback position after playing of the sound effect audition data is finished.

In an embodiment, the first sound effect addition module 92 includes a recognition unit and a sound effect addition unit.

The recognition unit is configured to recognize a target sound from the first audio segment through a preset sound recognition model.

The sound effect addition unit is configured to add the first sound effect to the target sound in the first audio segment, to generate audition data of the first sound effect on the first audio segment.

In an embodiment, the device 90 may further include a display module and a determination module.

The display module is configured to display at least one sound option.

The determination module is configured to determine a sound selected by the user from the at least one sound option, as the target sound.

In an embodiment, the target sound includes at least one of sound of a human, sound of an animal, sound of a vehicle, sound of a musical instrument, a background sound, and a foreground voice.

In an embodiment, the second sound effect addition module 94 is configured to add the second sound effect to a target sound in the second audio segment.

In an embodiment, the device 90 may further include a second acquisition module and a third sound effect addition module.

The second acquisition module is configured to acquire a second playback position on the second audio data, and a second adding instruction of the user for a third sound effect. The second adding instruction includes information on a second adding length of the third sound effect to be added on the second audio data.

The third sound effect addition module is configured to add the third sound effect to a third audio segment in the second audio data to obtain third audio data. The third audio segment starts from the second playback position and has a length of the second adding length.

In an embodiment, the device 90 may further include a smoothing module.

The smoothing module is configured to apply a fade-out effect on the second sound effect and a fade-in effect on the third sound effect, in a case that an end position of the second sound effect and the second playback position are consecutive on the third audio data.

The device provided in the embodiment is capable of performing the method in any of the embodiments with reference to FIG. 1 to FIG. 8. Execution and advantageous effects of the device is similar to that of the method, which will not be repeated herein.

A terminal device is further provided in an embodiment of the present disclosure. The terminal device includes a processor and a memory. The memory stores a computer program. The computer program, when executed by the processor, can perform the method according to any of the embodiments with reference to FIG. 1 to FIG. 8.

Figure 10:
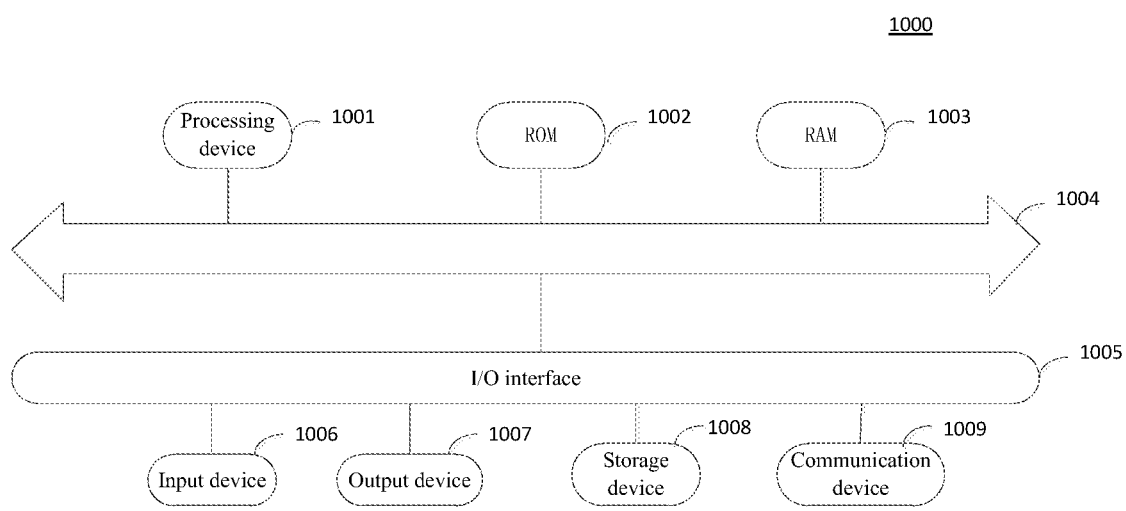
FIG. 10 is a schematic structural diagram of a terminal device according to an embodiment of the present disclosure.

FIG. 10 is a schematic structural diagram of a terminal device according to an embodiment of the present disclosure. Reference is made to FIG. 10, which shows a schematic structural diagram of a terminal device 1000 according to an embodiment of the present disclosure. The terminal device 1000 may include, but is not limited to, a mobile terminal, such as a mobile phone, a notebook computer, a digital broadcast receiver, a PDA (Personal Digital Assistants), a PAD (Tablet computers), a PMP (Portable Multimedia Players), a vehicle-mounted terminal (such as an in-vehicle navigation terminal), or the like, or a fixed terminal such as a digital TV, a desktop computer, or the like. The terminal device shown in FIG. 10 is merely an example, and should not impose any limitation on the functions and applications of the embodiments of the present disclosure.

As shown in FIG. 10, the terminal device 1000 may include a processing device (such as a central processing unit, a graphics processor) 1001 that may execute various appropriate actions and processes according to a program stored in a read only memory (ROM) 1002 or loaded into random access memory (RAM) 1003 from a storage device 1006. Various programs and data necessary for the operation of the terminal device 1000 are also stored in the RAM 1003. The processing device 1001, the ROM 1002, and the RAM 1003 are connected to each other through a bus 1004. An input/output (I/O) interface 1005 is also connected to the bus 1004.

Normally, an input device 1006 such as a touch screen, a touchpad, a keyboard, a mouse, a camera, a microphone, an accelerometer, a gyroscope and the like; an output device 1007, such as a liquid crystal display (LCD), a speaker, a vibrator and the like; a storage device 1006, such as a magnetic tape, a hard disk and the like; and a communication device 1009 may be connected to the I/O interface 1005. The communication device 1009 may enable the terminal device 1000 to communicate in a wireless or wired manner with other devices to exchange data. Although FIG. 13 shows the terminal device 1000 having various devices, it should be understood that not all of the illustrated devices are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer readable medium. The computer program includes program codes for performing the method illustrated in the flowchart. In such an embodiment, the computer program may be downloaded and installed from the network via the communication device 1009, or from the storage device 1006, or from the ROM 1002. When the computer program is executed by the processing device 1001, the above-mentioned functions in the methods of the embodiments of the present disclosure are executed.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage media may include, but are not limited to, electrical connections with one or more wires, portable computer disks, hard disks, a random-access memory (RAM), a read only memory (ROM), an erasable Programmable read only memory (EPROM or flash memory), an optical fiber, a portable compact disk read only memory (CD-ROM), optical storage devices, magnetic storage devices, or any suitable combination thereof. In this disclosure, a computer-readable storage medium may be any tangible medium that contains or stores a program that can be used by or in conjunction with an instruction execution system, apparatus or device. In the present disclosure, a computer-readable signal medium may include a data signal propagated in baseband or as part of a carrier wave with computer-readable program code embodied thereon. Such propagated data signals may be in a variety of forms, including but not limited to electromagnetic signals, optical signals, or any suitable combination thereof. A computer-readable signal medium can also be any computer-readable medium other than a computer-readable storage medium that can transmit, propagate, or transport the program for use by or in connection with the instruction execution system, apparatus or device. Program code stored on a computer readable medium may be transmitted using any suitable medium including, but not limited to, an electrical wire, an optical fiber cable, RF (radio frequency), or any suitable combination thereof.

In some embodiments, the client and server may use any currently known or future network protocol such as HTTP (HyperText Transfer Protocol) to communicate, and may be connected with digital data network in any form or medium (such as a communication network). Examples of communication networks include local area networks (LAN), wide area networks (WAN), the Internet (e.g., the Internet), and peer-to-peer networks (such as ad hoc peer-to-peer networks), as well as any current or future network.

The above-mentioned computer-readable medium may be included in the above-mentioned terminal device, or may exist alone without being assembled into the terminal device.

The above-mentioned computer-readable medium carries one or more programs. The above-mentioned one or more programs, when being executed by the terminal device, cause the terminal device to: acquire a first playback position on first audio data and an audition instruction of a user for a first sound effect; add the first sound effect to a first audio segment in the first audio data to generate sound effect audition data, and play the sound effect audition data, where the first audio segment starts from the first playback position; receive a first adding instruction of the user for a second sound effect, and add the second sound effect to a second audio segment in the first audio data in response to the received first adding instruction to obtain second audio data, where the first adding instruction includes information on a first adding length of the second sound effect to be added in the first audio data, and where the second audio segment starts from the first playback position and has a length of the first adding length.

Computer program codes for performing operations of the present disclosure may be written in one or more programming languages, including but not limited to object-oriented programming languages, such as Java, Smalltalk, C++, and conventional procedural programming languages, such as the "C" language or similar programming languages. The program code may be executed entirely on a user computer, or partly on a user computer, or as a stand-alone software package, or partly on a user computer and partly on a remote computer, or entirely on a remote computer or server. In the case of using a remote computer, the remote computer may be connected to the user's computer through any kind of network, including a local area network (LAN) or a wide area network (WAN), or may be connected to an external computer (e.g., using Internet connection provided by an Internet service provider).

The flowchart and block diagrams in the drawings illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the figures. For example, two blocks shown in succession may be executed substantially concurrently, or the blocks may sometimes be executed in the reverse order, depending upon the functionality involved. It is also noted that each block of the block diagrams and/or flowchart, and combinations of blocks in the block diagrams and/or flowchart, may be implemented in dedicated hardware-based systems that perform the specified functions or operations, or may be implemented by a combination of dedicated hardware and computer instructions.

The units involved in the embodiments of the present disclosure may be implemented in a software manner, or in a hardware manner. The name of the unit does not constitute a limitation of the unit under any circumstances.

The functions described above may be performed, at least in part, by one or more hardware logic components. For example, without limitation, examples of hardware logic components that may be used include: a Field Programmable Gate Array (FPGA), an Application Specific Integrated Circuit (ASIC), an Application Specific Standard Product (ASSP), a System on Chip (SOC), a Complex Programmable Logical Device (CPLD) and the like.

In the present disclosure, a machine-readable medium may be a tangible medium that may contain or store a program for use by or in connection with the instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, devices, or devices, or any suitable combination thereof. More specific examples of machine-readable storage media include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof.

A computer-readable storage medium is further provided in an embodiment of the present disclosure. The storage medium stores a computer program. The computer program, when executed by a processor, can perform the method according to any of the embodiments with reference to FIG. 1 to FIG. 8. Execution and advantageous features of the storage medium are similar to the method, and is not repeated here.

It should be noted that the relational terms in this specification such as "first", "second", and the like, are used to distinguish an entity or operation from another entity or operation, rather than to necessarily require or imply any actual relationship or order of these entities or operations. Moreover, terms "comprise", "include", and variations thereof used herein are intended to be non-exclusive. Therefore, a process, method, article, or apparatus including a series of elements includes not only the listed elements, but further include other elements not explicitly listed or inherent to the process, method, article, or apparatus. Without further restrictions, an element defined by a statement "include a(n) . . . " do not exclude existence of other identical elements in a process, method, article or apparatus including the element.

Hereinabove described are specific embodiments of the present disclosure, which enables those skilled in the art to understand or implement the present disclosure. Various modifications to the embodiments are apparent to those skilled in the art. General principles defined herein may be implemented in other embodiments without departing the sprit or scope of the present disclosure. Therefore, the present disclosure would not be limited to the embodiments described in this specification, but shall conform to the widest scope consistent with the principles and novel features disclosed herein.

The invention claimed is:

1. A method for processing audio data, comprising:
   acquiring a first playback position on first audio data and an audition instruction of a user for at least one first sound effect;
   adding the at least one first sound effect to a first audio segment in the first audio data to generate sound effect audition data, and auditioning the generated sound effect audition data, wherein the first audio segment starts from the first playback position;
   selecting a sound effect from the auditioned at least one first sound effect as a second sound effect, based on the auditioned sound effect audition data generated by adding the at least one first sound effect to the first audio segment;
   receiving a first adding instruction of the user for the second sound effect, wherein the first adding instruction comprises information on a first adding length of the second sound effect to be added in the first audio data; and adding the second sound effect to a second audio segment in the first audio data to obtain second audio data, wherein the second audio segment starts from the first playback position, and has a length of the first adding length,
   wherein adding the at least one first sound effect to the first audio segment in the first audio data to generate the sound effect audition data comprises:
      displaying one or more sound options, and selecting at least one from the one or more sound options as a target sound;
      recognizing the target sound from the first audio segment through a preset sound recognition model; and
      adding the at least one first sound effect to the target sound in the first audio segment, to generate audition data of the first sound effect on the first audio segment.

2. The method according to claim 1, wherein the first audio data is audio data of a to-be-edited video in a video editing interface.

3. The method according to claim 2, wherein acquiring the first playback position on the first audio data and the audition instruction of the user for the at least one first sound effect comprising:
   displaying the video editing interface, wherein the video editing interface comprises a playback progress control for a video and a sound effect control for the first sound effect; and
   acquiring the first playback position selected by the user through the playback progress control, and the audition instruction triggered by the user through the sound effect control.

4. The method according to claim 1, further comprising:
   returning a playback position of the first audio data to the first playback position, after playing of the sound effect audition data is finished.

5. The method according to claim 1, wherein adding the second sound effect to the second audio segment in the first audio data comprises:
   adding the second sound effect to a target sound in the second audio segment.

6. The method according to claim 1, wherein after adding the second sound effect to the second audio segment in the first audio data to obtain the second audio data, the method further comprises:
   obtaining a second playback position on the second audio data, and a second adding instruction of the user for a third sound effect, wherein the second adding instruction comprises information on a second adding length of the third sound effect to be added to the second audio data; and
   adding the third sound effect to a third audio segment in the second audio data to obtain third audio data, wherein the third audio segment starts from the second playback position and has a length of the second adding length.

7. The method according to claim 6, further comprising:
   applying a fade-out effect on the second sound effect and a fade-in effect on the third sound effect, in a case that an end position of the second sound effect and the second playback position are two consecutive playback positions on the third audio data.

8. A terminal device, comprising:
   a memory; and
   a processor, wherein:
   the memory stores a computer program; and the computer program, when executed by the processor, causes the processor to:
   acquire a first playback position on first audio data and an audition instruction of a user for at least one first sound effect;
   add the at least one first sound effect to a first audio segment in the first audio data to generate sound effect audition data, and audition the sound effect audition data, wherein the first audio segment starts from the first playback position;
   select a sound effect from the auditioned first sound effect as a second sound effect, based on the auditioned sound effect audition data generated by adding the at least one first sound effect to the first audio segment;
   receive a first adding instruction of the user for the second sound effect, wherein the first adding instruction comprises information on a first adding length of the second sound effect to be added in the first audio data; and add the second sound effect to a second audio segment in the first audio data to obtain second audio data, wherein the second audio segment starts from the first playback position, and has a length of the first adding length, wherein the computer program, when executed by the processor, causes the processor to:

present an interface comprising one or more sound options, and select at least one from the one or more sound options as a target sound;

recognize the target sound from the first audio segment through a preset sound recognition model; and add the at least one first sound effect to the target sound in the first audio segment, to generate audition data of the first sound effect on the first audio segment.

9. The terminal device according to claim 8, wherein the first audio data is audio data of a to-be-edited video in a video editing interface.

10. The terminal device according to claim 9, wherein the computer program, when executed by the processor, causes the processor to:

display the video editing interface, wherein the video editing interface comprises a playback progress control for a video and a sound effect control for the first sound effect; and acquire the first playback position selected by the user through the playback progress control, and the audition instruction triggered by the user through the sound effect control.

11. The terminal device according to claim 8, wherein the computer program, when executed by the processor, causes the processor to:

return a playback position of the first audio data to the first playback position, after playing of the sound effect audition data is finished.

12. The terminal device according to claim 8, wherein the computer program, when executed by the processor, causes the processor to:

add the second sound effect to a target sound in the second audio segment.

13. The terminal device according to claim 8, wherein the computer program, when executed by the processor, causes the processor to:

obtain a second playback position on the second audio data, and a second adding instruction of the user for a third sound effect, wherein the second adding instruction comprises information on a second adding length of the third sound effect to be added to the second audio data; and add the third sound effect to a third audio segment in the second audio data to obtain third audio data, wherein the third audio segment starts from the second playback position and has a length of the second adding length.

14. The terminal device according to claim 13, wherein the computer program, when executed by the processor, causes the processor to:

apply a fade-out effect on the second sound effect and a fade-in effect on the third sound effect, in a case that an end position of the second sound effect and the second playback position are two consecutive playback positions on the third audio data.

15. A non-transitory computer-readable storage medium storing a computer program, wherein;

the computer program, when executed by a processor, causes the processor to:

acquire a first playback position on first audio data and an audition instruction of a user for at least one first sound effect;

add the at least one first sound effect to a first audio segment in the first audio data to generate sound effect audition data, and audition the generated sound effect audition data, wherein the first audio segment starts from the first playback position;

select a sound effect from the auditioned first sound effect as a second sound effect, based on the audition sound effect audition data generated by adding the at least one first sound effect to the first audio segment;

receive a first adding instruction of the user for the second sound effect, wherein the first adding instruction comprises information on a first adding length of the second sound effect to be added in the first audio data; and add the second sound effect to a second audio segment in the first audio data to obtain second audio data, wherein the second audio segment starts from the first playback position, and has a length of the first adding length, wherein the computer program, when executed by a processor, causes the processor to:

present an interface comprising one or more sound options, and select at least one from the one or more sound options as a target sound;

recognize the target sound from the first audio segment through a preset sound recognition model; and add the at least one first sound effect to the target sound in the first audio segment, to generate audition data of the first sound effect on the first audio segment.

* * * * *